W. H. PRIDGEN.
MACHINE FOR HARVESTING CLOVER SEEDS.
APPLICATION FILED OCT. 4, 1915.
1,190,457.
Patented July 11, 1916.
3 SHEETS—SHEET 3.
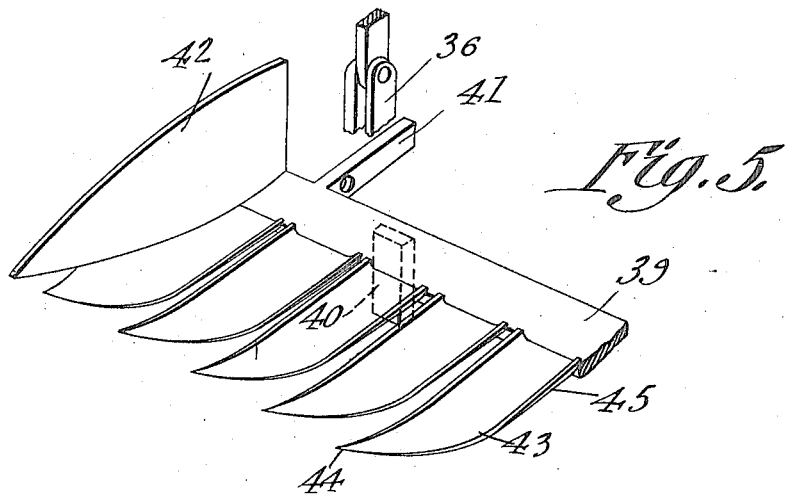
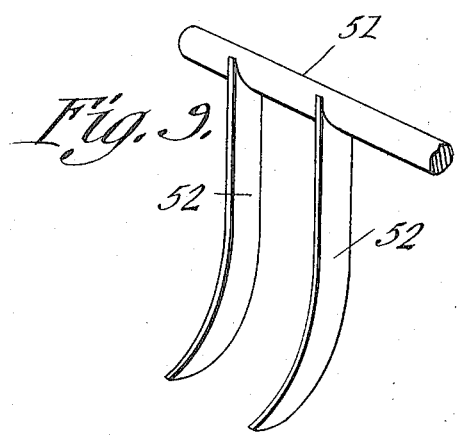
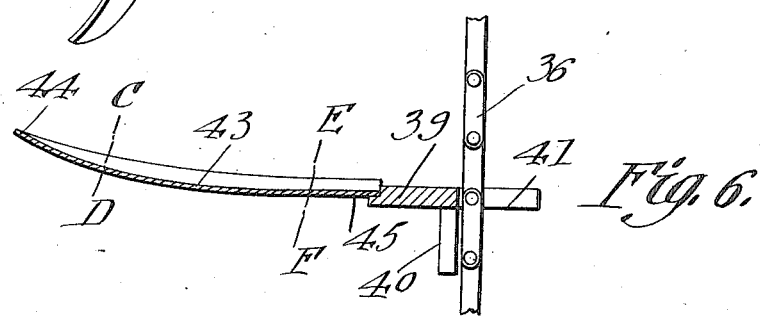
W. H. Pridgen, Inventor

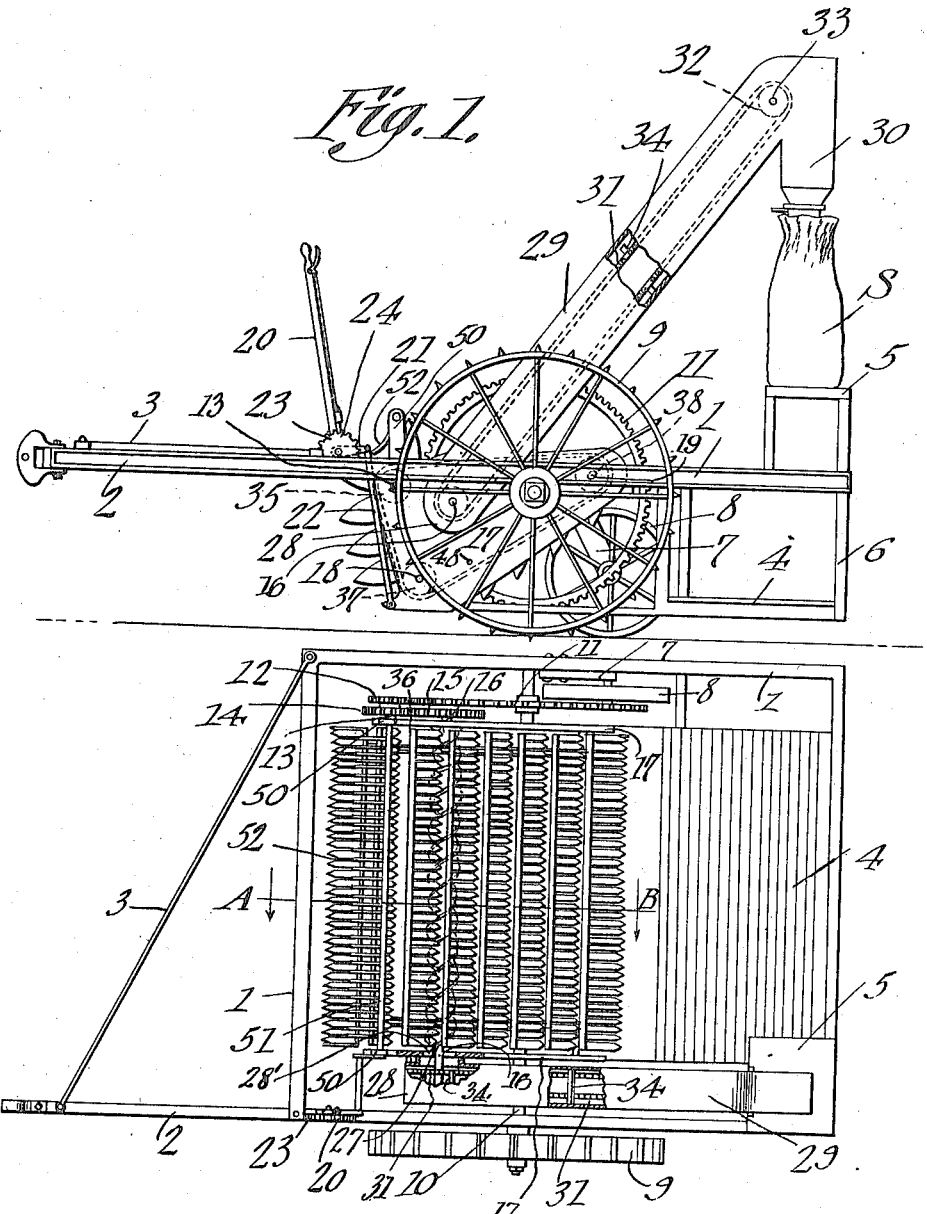

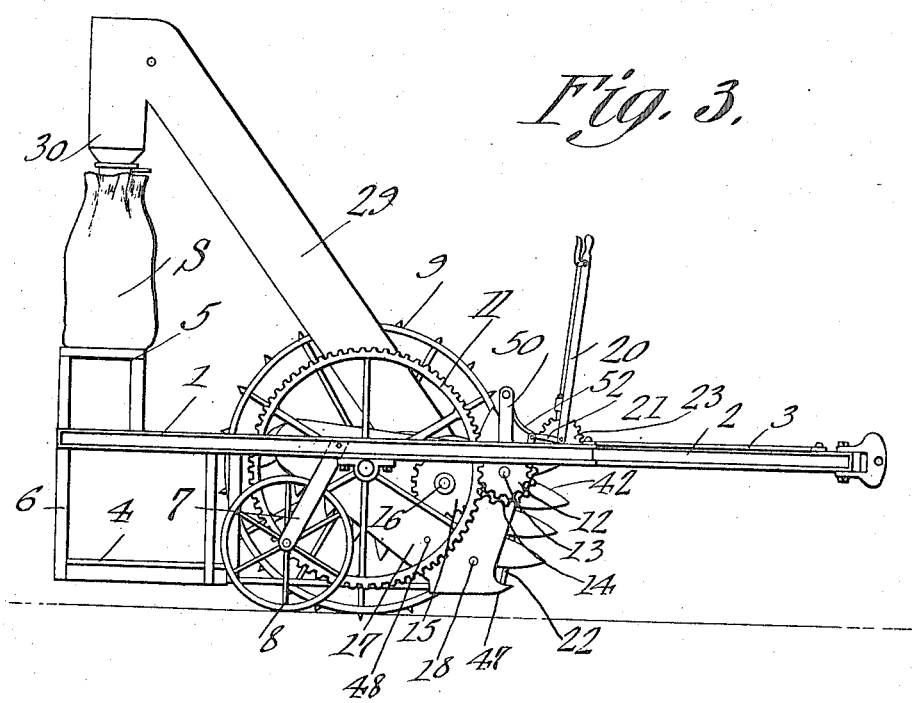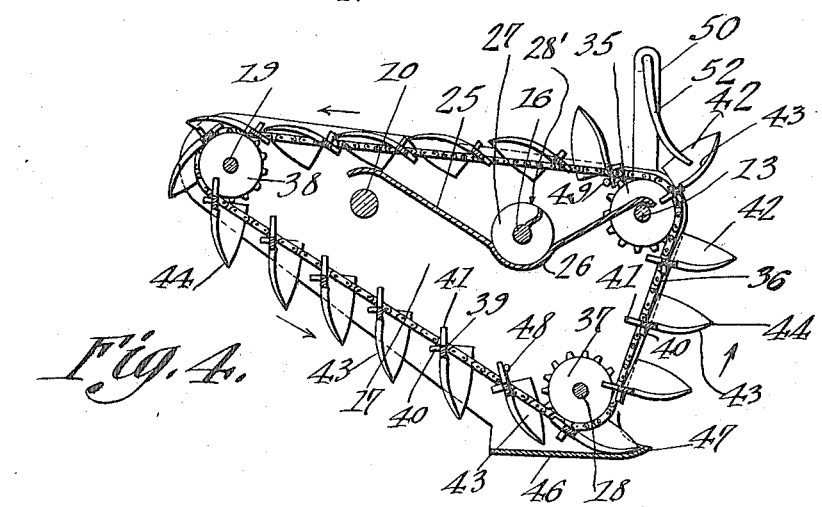

UNITED STATES PATENT OFFICE.

WILEY H. PRIDGEN, OF CREEK, NORTH CAROLINA.

MACHINE FOR HARVESTING CLOVER-SEEDS.

1,190,457.  Specification of Letters Patent.  Patented July 11, 1916.

Application filed October 4, 1915. Serial No. 53,998.

*To all whom it may concern:*

Be it known that I, WILEY H. PRIDGEN, a citizen of the United States, residing at Creek, in the county of Warren and State of North Carolina, have invented a new and useful Machine for Harvesting Clover-Seeds, of which the following is a specification.

This invention relates to machines for harvesting clover seed, one of the objects being to provide a machine of this type utilizing an endless series of gathering members operating to collect the seeds and convey them to a receptacle from which they are removed and elevated to a sack or other receiver provided therefor.

A further object is to provide means whereby weeds and other vegetation are cleared from the conveying means so that choking of the machine is prevented.

A further object is to provide a machine of this character which is light, durable and compact in construction, can be manipulated readily, and will not easily get out of order.

Another object is to provide seed gathering means of novel form and which serve to completely strip the seeds from the plants and at the same time to receive and support the seeds while they are being conveyed to the receptacle provided therefor.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine, a portion being broken away. Fig. 2 is a plan view, a portion of the elevator casing being broken away. Fig. 3 is an elevation of that side of the machine opposite to that shown in Fig. 1. Fig. 4 is an enlarged section on line A—B Fig. 2. Fig. 5 is a perspective view of a portion of one of the gathering heads. Fig. 6 is an enlarged central longitudinal section through one of the gathering fingers and the bar to which it is secured. Fig. 7 is a section on line C—D Fig. 6, said section being taken through two of the gathering fingers. Fig. 8 is a view similar to Fig. 7, but taken on the line E—F Fig. 6. Fig. 9 is a perspective view of a portion of the series of clearing knives.

Referring to the figures by characters of reference 1 designates a frame provided at one side with a forwardly extending draft beam 2 which can be suitably braced as at 3, while carried by the rear portion of the frame is a platform 4, above one side of which is arranged a shelf 5 designed to support a sack S or other receptacle for the reception of the harvested seeds. Platform 4 is preferably supported close to the ground by hangers 6 depending from the frame 1.

A hanger 7 extends from one side portion of frame 1 and journaled thereon is a small supporting wheel 8. A large supporting wheel 9 is arranged at the other side of the frame and is connected to and rotates a shaft 10 extending transversely of the frame. Secured to that end portion of shaft 10 nearest the small supporting wheel 8 is a large gear 11 constantly in mesh with a small gear 12 secured to one end of a transverse shaft 13. Another gear 14 is secured to shaft 13 and is constantly in mesh with a gear 15 secured to a transverse shaft 16.

The shafts 13 and 16 are journaled within substantially triangular side boards or guards 17 tiltably supported by the axle 10, the shaft 13 being journaled in the upper front corner portions of the guards 17, while journaled in the front lower corner portions of said guards is a transverse shaft 18. Another transverse shaft 19 is journaled in the back corner portions of the guards. An adjusting lever 20 is supported by the frame 1 and has an arm 21 extending from the lower portion thereof and connected by a link 22 to one of the guards 17. A toothed segment 23 and a pawl 24 may be provided for locking the lever 20 in any position to which it may be adjusted. Obviously by means of lever 20 the guards 17 and the parts carried thereby can be swung upwardly or downwardly about the shaft or axle 10 as a center.

Extending under shaft 16 is a hopper 25 which constitutes a connection between the guards 17, this hopper being provided at its lowermost portion with a transverse trough 26 concentric with shaft 16. A worm conveyer 27 is secured to shaft 16 and works within the trough so as to discharge material laterally from the hopper through an opening 28' and into the lower end 28 of an elevator casing 29. This casing is inclined upwardly and rearwardly from and is secured to one of the guards 17 and has, at its upper end, a depending discharge spout 30 located directly above the shelf 5. The casing 29 is supported solely by the guard 17 to which it is secured. An endless elevator 31 is arranged in casing 29 and is driven by shaft 16, the upper portion of the elevator being mounted on sprockets 32 or the like carried by a shaft 33 journaled in the upper portion of casing 29. The conveyer or elevator 31 is preferably made up of chains having transverse slats 34 adapted to drag along the bottom of casing 29, thus to draw material upwardly along the bottom of said casing and to the spout 30. Thus it will be seen that as fast as seeds are discharged from hopper 25 into the lower end 28, they will be conveyed upwardly to the spout 30 and into the sack S provided therefor.

The front portion of hopper 25 overhangs the shaft 13 and secured to said shaft are sprockets 35 engaging endless chains 36 the front portions of which extend downwardly under sprockets 37 secured to shaft 18 and thence rearwardly to sprockets 38 secured to shaft 19. From these sprockets 38 the chains extend forwardly to the sprockets 35. Pivotally connected to certain of the links of the chains are parallel cross bars 39. Extending from each of the bars 39 close to each end thereof is a stop finger 40 and stripping finger 41. The stop fingers are adapted to bear against the adjacent chains 36, thus to hold the bars 39 extended at right angles from the chains while traveling between the sprockets 37 and 35, as shown in Fig. 6. The stripping fingers 41 are extended backwardly at right angles to the fingers 40 and extend past the chains. At each end of each bar 39 is an upstanding rod 42 and projecting forwardly from each bar 39 is a series of collecting or gathering fingers 43. Each of the fingers has its forward end pointed and upturned, as at 44 and is transversely concaved for a desired distance back from the point, where the finger merges into a pan-like portion 45 extending up to the bar 39. The lower forward portions of the guards 17 are connected by a cross blade 46 the forward portion of which is preferably upturned, as at 47 thus to lie close to the path of the collecting fingers 43. Extending inwardly from the guards 17 at points above the rear edge of the plate 46 are tripping pins 48. Additional tripping pins 49 are extended inwardly from the guards 17 close to, and back of the sprockets 35.

Standards 50 extend upwardly from the front portions of the guards 17 and are connected by a cross rod 51 having depending knives 52 the lower ends of which are preferably curved downwardly and forwardly so as to be received between the fingers 43 which are spaced apart slight distances as shown particularly in Fig. 5.

It will be apparent that when the machine is drawn forward, motion will be transmitted from the wheel 9 to the various shafts and chains with the result that the series of collecting fingers will be moved in the directions indicated by the arrows in Fig. 4. As each series of fingers is brought to position above the blade 46, the tripping fingers 41 will strike against pins 48 and cause the fingers 43 to swing forwardly, thus to glide over the blade 46. Blade 46 during its forward movement will ride over the plants and depress them with their tops or heads projecting upwardly into the paths of the fingers 43. These fingers will be projected forwardly from the upwardly moving portions of the chains 36 and will comb through the plants, removing the seeds therefrom. The removed seeds will be deposited on the fingers 43 and retained thereby until after said fingers have been carried upwardly and rearwardly over the sprockets 35 whereupon the fingers 41 will be tripped by the pins 49 and the contents of the gathering fingers will be discharged into the hopper 25. Conveyer 27 will carry the seeds laterally to the elevator casing where they will in turn be conveyed upwardly to the discharge spout 30. As the knives 52 project between the paths of the gathering fingers 43 it will be obvious that any weeds or other plants which may be carried upwardly by the fingers will be removed therefrom and there will thus be no danger of the machine becoming clogged.

What is claimed is:—

1. A machine for harvesting clover seeds, including a wheel supported structure movable forwardly over a field, a hopper movable with said structure, endless chains carried by said structure and movable in a path extending forwardly under the hopper, upwardly and rearwardly over the hopper, means operated by the forward movement of the structure for driving the chains, parallel rows of stripping and collecting fingers carried by the chains, means for holding each series of fingers extended forwardly during its movement in the upward and rearward paths of the chains, and means for tilting each series of fingers when brought to position above the hopper, to direct the contents of the fingers into the hopper.

2. In a clover seed harvester, endless chains movable in paths portions of which extend upwardly, pivoted bars connecting the chains, a series of fingers extending from each bar, the fingers of each series being arranged side by side and spaced apart, the front end of each finger being pointed, all of the fingers having upturned retaining side portions, and means upon the bars coöperating with the chains for holding the fingers in retaining positions during the upward movement of the bars and fingers with the chains, and means for moving the chains.

3. In a clover seed harvester, a cross blade having an upturned forward portion, an endless series of parallel bars movable over and upwardly from the blade, means for moving the series of bars, a hopper, said bars being movable over the hopper, spaced fingers extending from the bars, said bars being pivotally mounted, means for successively swinging the fingers forwardly above the blade, means for supporting the fingers in forwardly extended positions during their upward movement, and means for swinging the fingers when above the hopper to discharge the contents thereof into the hopper.

4. In a clover seed harvester, a cross blade having an upturned forward portion, an endless series of parallel bars movable over and upwardly from the blade, means for moving the series of bars, a hopper, said bars being movable over the hopper, spaced fingers extending from the bars, said bars being pivotally mounted, means for successively swinging the fingers forwardly above the blade, means for supporting the fingers in forwardly extended positions during their upward movement, means for swinging the fingers to discharge the contents thereof into the hopper, and clearing blades extending between the paths of the fingers.

5. In a clover seed harvester, a cross blade having an upturned forward portion, an endless series of parallel bars movable over and upwardly from the blade, means for moving said series of bars, a hopper, said bars being movable over the hopper, spaced fingers extending from the bars, said bars being pivotally mounted, means for successively swinging the fingers forwardly above the blade, means for supporting the fingers in forwardly extended positions during their upward movement, means for swinging the fingers to discharge the contents thereof into the hopper, an elevator and means for directing seeds from the hopper to the elevator.

6. In a clover seed harvester, a movably supported frame, tiltable guards thereon, endless chains supported between the guards and having their forward portions extended upwardly and merging into upper rearwardly extending portions of the chains, means for actuating the chains, a series of parallel bars pivotally connected to and movable with the chains, a hopper connected to the guards and below the upper portions of the chains, stripping and gathering fingers extending from the bars, a transverse blade connecting the lower portions of the guards for bearing downwardly upon the plants being stripped, coöperating means upon the guards and bars for swinging the lower portions of the fingers forwardly as they pass successively over the blade, means upon the bars and coöperating with the chains for holding the fingers in forwardly extended positions during the upward movement thereof, and means for tilting the fingers to discharge the contents thereof into the hopper.

7. In a clover seed harvester, a movably supported frame, tiltable guards thereon, endless chains supported between the guards moving in paths portions of which are extended upwardly, means for moving the chains, a series of parallel bars pivotally connected to and movable with the chains, a hopper connected to the guards and below the upper portions of the chains, stripping and gathering fingers extending from the bars, a transverse blade connecting the lower portions of the guards for bearing downwardly upon the plants being stripped, coöperating means upon the guards and bars for swinging the lower portions of the fingers forwardly as they pass successively over the blade, means upon the bars and coöperating with the chains for holding the fingers in forwardly extended positions during the upward movement thereof, means for tilting the fingers to discharge the contents thereof into the hopper, an elevator connected to and extending from one of the guards, and means for removing seeds from the hopper and depositing them upon the elevator.

8. In a clover seed harvester, a movably supported frame, tiltable guards thereon, endless chains supported between the guards and moving in paths portions of which are extended upwardly, means for moving the chains, a series of parallel bars pivotally connected to and movable with the chains, a hopper connected to the guards and below the upper portions of the chains, stripping and gathering fingers extending from the bars, a transverse blade connecting the lower portions of the guards for bearing downwardly upon the plants being stripped, coöperating means upon the guards and bars for swinging the lower portions of the fingers forwardly as they pass successively over the blade, means upon the bars and coöperating with the chains for holding the fingers in forwardly extending positions during the upward movement thereof, means for tilting the fingers to discharge the contents thereof into the hopper, an elevator connected to and extending from one of the guards, means for removing seeds from the hopper and depositing them upon the elevator, and means for adjusting angularly the guards and the parts carried thereby.

9. In a clover seed harvester, a movably supported frame, tiltable guards thereon, endless chains supported between the guards and moving in paths portions of which are extended upwardly, means for moving the chains, a series of parallel bars pivotally connected to and movable with the chains, a hopper connected to the guards and below the upper portions of the chains, stripping and gathering fingers extending from the bars, a transverse blade connecting the lower portions of the guards for bearing downwardly upon the plants being stripped, coöperating means upon the guards and bars for swinging the lower portions of the fingers forwardly as they pass successively over the blade, means upon the bars and coöperating with the chains for holding the fingers in forwardly extended positions during the upward movement thereof, means for tilting the fingers to discharge the contents thereof into the hopper, and means operated by the forward movement of the machine for actuating the chains.

10. In a clover seed harvester, a movably supported frame, tiltable guards thereon, endless chains supported between the guards and moving in paths the forward portions of which extend upwardly, means for moving the chains, a series of parallel bars pivotally connected to and movable with the chains, a hopper connected to the guards and below the upper portions of the chains, stripping and gathering fingers extending from the bars, a transverse blade connecting the lower portions of the guards for bearing downwardly upon the plants being stripped, coöperating means upon the guards and bars for swinging the lower portions of the fingers forwardly as they pass successively over the blade, means upon the bars and coöperating with the chains for holding the fingers in forwardly extended positions during the upward movement thereof, means for tilting the fingers to discharge the contents thereof into the hopper, means operated by the forward movement of the machine for actuating the chains, and clearing blades extending downwardly between the paths of the fingers.

In testimony that I claim the foregoing as my own, I have hereto affixed my signature in the presence of two witnesses.

WILEY H. PRIDGEN.

Witnesses:
EDWARD C. PRICE,
J. A. DOWTIN.

Copies of this patent may be obtained for five cents each, by addressing the "Commissioner of Patents, Washington, D. C."